United States Patent
Whitmarsh et al.

(10) Patent No.: US 6,890,248 B2
(45) Date of Patent: May 10, 2005

(54) APPARATUS AND METHOD FOR CONSISTENTLY RETAINING A GAS TURBINE ENGINE BLADE IN A PREDETERMINED POSITION AND ORIENTATION

(75) Inventors: Robert Duane Whitmarsh, West Newbury, MA (US); Larisa Alexandra Elman, Swampscott, MA (US); Robert Allan Ahti, Hillsborough, NH (US)

(73) Assignee: General Electric Company, Schenectady, NY (US)

( * ) Notice: Subject to any disclaimer, the term of this patent is extended or adjusted under 35 U.S.C. 154(b) by 181 days.

(21) Appl. No.: 10/375,952

(22) Filed: Feb. 28, 2003

(65) Prior Publication Data

US 2004/0171330 A1 Sep. 2, 2004

(51) Int. Cl.⁷ .............................................. B24B 41/06
(52) U.S. Cl. ...................... 451/365; 451/28; 269/296; 29/281.1
(58) Field of Search .................... 451/28, 365, 369, 451/387, 403, 405; 269/296, 297; 29/281.1, 889.2, 889.7

(56) References Cited

U.S. PATENT DOCUMENTS

| | | | | |
|---|---|---|---|---|
| 4,128,929 A | * | 12/1978 | DeMusis | 29/889.1 |
| 4,638,602 A | | 1/1987 | Cavalieri | 51/217 R |
| 4,805,351 A | | 2/1989 | Dobson et al. | 51/217 R |
| 4,829,720 A | | 5/1989 | Cavalieri | 51/217 R |
| 6,017,263 A | | 1/2000 | Dwyer | 451/28 |
| 6,068,541 A | | 5/2000 | Dwyer | 451/28 |
| 6,139,412 A | | 10/2000 | Dwyer | 451/365 |
| 6,186,867 B1 | * | 2/2001 | Dwyer | 451/28 |
| 6,287,182 B1 | | 9/2001 | Dwyer | 451/365 |
| 6,568,993 B1 | * | 5/2003 | Jones et al. | 451/28 |
| 6,652,369 B2 | * | 11/2003 | Jones et al. | 451/365 |

FOREIGN PATENT DOCUMENTS

GB        2278825 A        12/1994

OTHER PUBLICATIONS

"Grinders Go With The Flow," American Machinist.Com (Jun. 1, 2002).
Patent Abstracts of Japan, vol. 0092, No. 09 (M–407), Aug. 27, 1985 & JP 60 071138 A (Aishin Seiki KK), Apr. 23, 1985.

* cited by examiner

*Primary Examiner*—Joseph J. Hail, III
*Assistant Examiner*—Anthony Ojini
(74) *Attorney, Agent, or Firm*—V. G. Ramaswamy; James P. Davidson

(57) ABSTRACT

A method and apparatus of retaining a gas turbine engine blade in a fixed predetermined position includes the following steps: inserting an airfoil portion of the gas turbine engine blade within a device so as to be loosely held therein; orienting the gas turbine engine blade so as to have a predetermined relationship with the device; providing an initial clamping force on the device so as to retain the gas turbine engine blade in the predetermined position; and, actuating a mechanism associated with the device to provide a fixed clamping force on the airfoil portion so that the gas turbine engine blade is retained in the predetermined position.

25 Claims, 9 Drawing Sheets

APPARATUS AND METHOD FOR CONSISTENTLY RETAINING A GAS TURBINE ENGINE BLADE IN A PREDETERMINED POSITION AND ORIENTATION

BACKGROUND OF THE INVENTION

The present invention relates generally to a blade for a gas turbine engine and, more particularly, to an apparatus and method of retaining such gas turbine engine blade in a predetermined position and orientation so that machining operations may be performed thereon in a consistent manner.

Manufacturing methods for gas turbine engine blades, and particularly the dovetails thereof, have typically been designed for batch production. While this approach has been thought to increase production, complex and expensive equipment is oftentimes required to accomplish the method. The grinding of finished dovetail shapes for airfoil blades is also an iterative and highly labor intensive process. If the desired dimensional results are not achieved for a particular test or tryout blade from a batch, the whole batch of such blades is scrapped and a new iteration cycle commences. This obviously can lead to a high level of manufacturing losses and overall process inefficiency.

Accordingly, a single piece flow concept has emerged as a simpler and more efficient approach to machining finished dovetail shapes for gas turbine engine blades. This approach has the added benefit of eliminating the low melt alloy matrix material utilized for encapsulating the airfoil shape while the blades are ground, which are known to contain environmentally unfriendly substances. In order to take advantage of the single piece flow concept, however, a device for retaining a gas turbine engine blade in a desirable position and orientation for the dovetail grinding operation to be accomplished is required. Such device should be configured so as to permit easy access to the root portion of the blade while holding the blade in a consistent manner which does not deform the airfoil portion. Further, orientation of the blade within the device must be highly accurate for a given class or size of blades.

Various types of retention devices and orientation systems for a gas turbine engine blade are known in the art, as seen by U.S. Pat. Nos. 6,017,263, 6,068,541, 6,139,412 and 6,287,182 to Dwyer. As seen therein, however, certain manufacturing operations must be performed on the gas turbine engine blades themselves so as to provide locating notches and guides. This serves to complicate the initial aspect of the process, as well as creates the need for additional finishing steps after the dovetail is formed. It will also be appreciated that access to the root portion of the blade is not without obstructions since clamping of the blade occurs at such location.

Another fixture for holding gas turbine engine blades is disclosed in U.S. Pat. Nos. 4,638,602 and 4,829,720 to Cavalieri. While access to the root portion of the blade is improved in such fixtures, the manner in which the blade is clamped in position (i.e., via a longitudinal pin which abuts against the datum point of the blade) can potentially cause deformation of the airfoil portion. This stems from a lack of mating to a substantial portion of the pressure and suction surfaces of the airfoil portion. Further, the limited point of clamping contact with the blade may create inconsistent positioning between blades held in such device.

While the aforementioned devices and methods of retaining a gas turbine engine blade are useful for their particular purpose, it would be desirable for an apparatus and method of retaining gas turbine engine blades to be developed which consistently positions a given size of blades in a predetermined orientation, provides easy access for machining operations, and enables easy insertion and removal of a blade therefrom. It would also be desirable for such retention device to be simple, inexpensive, reduce associated tooling costs, and allow use of smaller and less expensive machines.

BRIEF SUMMARY OF THE INVENTION

In a first exemplary embodiment of the invention, an apparatus for retaining a gas turbine engine blade in a fixed predetermined position and orientation is disclosed as including a base portion and a top portion, each of which having a forward end, an aft end, a top surface and a bottom surface. The base portion further includes a forward portion located adjacent the forward end, where the forward portion includes a top surface configured to substantially conform to a suction surface of an airfoil portion for the gas turbine engine blade, and an elongated groove portion formed in the top surface adjacent the aft end. The top portion further includes: a forward portion located adjacent the forward end, the forward portion including a bottom surface configured to substantially conform to a pressure surface of the airfoil portion for the gas turbine engine blade; a pin member extending from the bottom surface at the aft end which is matable with the groove portion of the base portion; and, a slot portion formed in the top portion bottom surface between the pin member and the forward end. The apparatus further includes a mechanism for connecting the base and top portions at a first designated point between the forward and aft ends. A block member is positioned within the slot portion between the base and top portions, where the block is adapted to slide along the groove portion between a first position adjacent the first designated point and a second position adjacent the pin member. Accordingly, a predetermined clamping force is provided on the airfoil portion of the gas turbine engine blade between the forward portion top surface of the base portion and the forward portion bottom surface of the top surface when the block member is at the second position.

In a second exemplary embodiment of the invention, a method of retaining a gas turbine engine blade in a fixed predetermined position is disclosed as including the following steps: inserting an airfoil portion of the gas turbine engine blade within a device so as to be loosely held therein; orienting the gas turbine engine blade so as to have a predetermined relationship with the device; providing an initial clamping force on the device so as to retain the gas turbine engine blade in the predetermined position; and, actuating a mechanism associated with the device to provide a fixed clamping force on the airfoil portion so that the gas turbine engine blade is retained in the predetermined position.

DETAILED DESCRIPTION OF THE INVENTION

Figure 1:
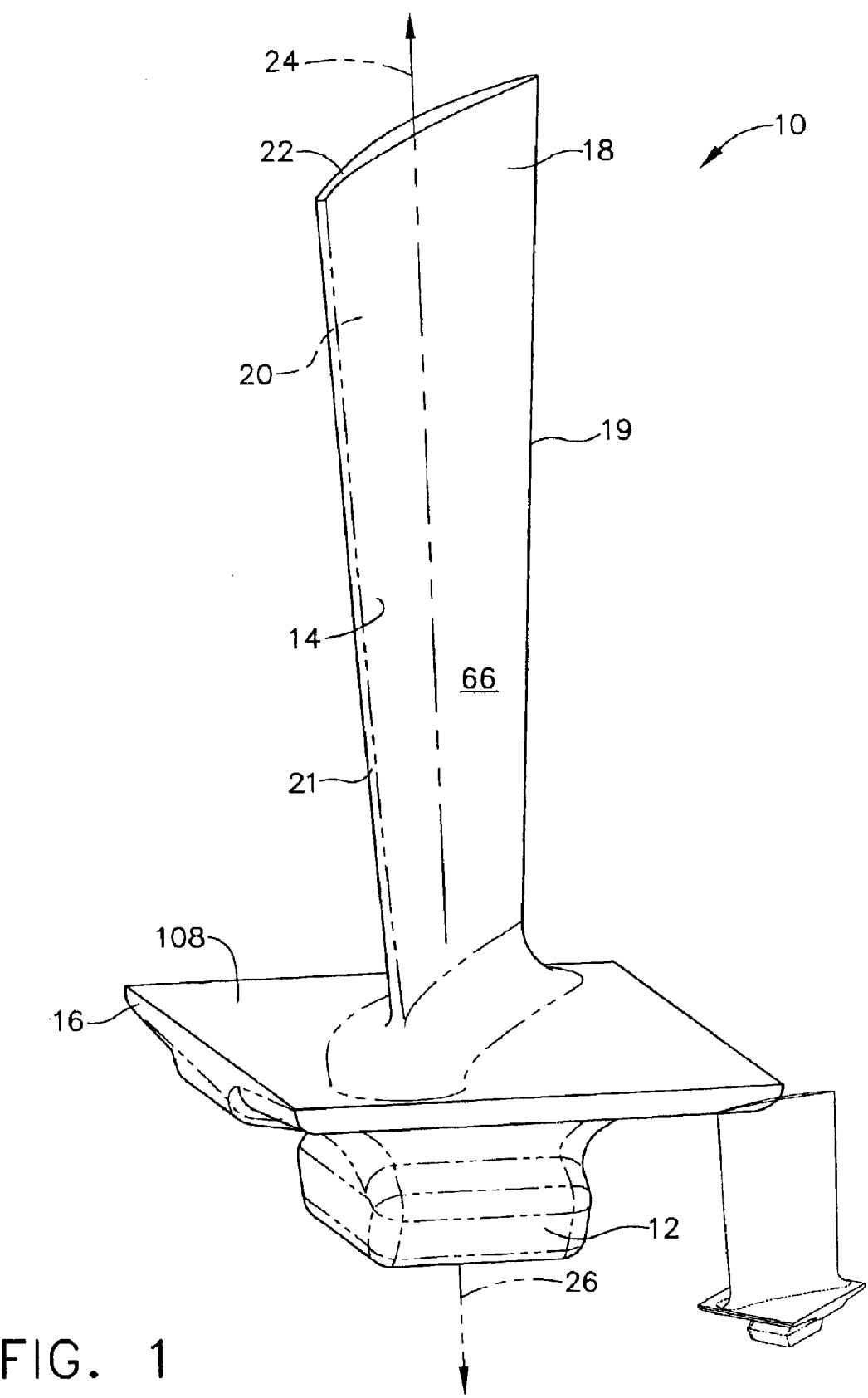
FIG. 1 is a perspective view of an exemplary blade utilized in a gas turbine engine.

Referring now to the drawings in detail, wherein identical numerals indicate the same elements throughout the figures, FIG. 1 generally depicts a blade 10 which is utilized in a compressor or turbine of a gas turbine engine. It will be understood that blade 10 includes a root portion 12, an airfoil portion 14 and a platform 16 separating root and airfoil portions 12 and 14. More specifically, airfoil portion 14 includes a generally concave pressure surface 18, a generally convex suction surface 20 and a tip 22 located at a distal end. Airfoil portion 14 also includes a leading edge 19 and a trailing edge 21. A first stacking axis 24 extends through airfoil portion 14 while a second stacking axis 26, which may or may not be aligned with first stacking axis 24, extends through root portion 12. It will be appreciated that root portion 12 of blade 10 preferably undergoes certain machining operations in order to configure it with dovetails so as to mate with corresponding dovetail slots in a shroud for a compressor or turbine. The tolerances permitted between blades is necessarily stringent. Thus, in order for such machining operations to take place in a consistent manner, blade 10 preferably is retained so as to have a predetermined orientation.

Figure 2:
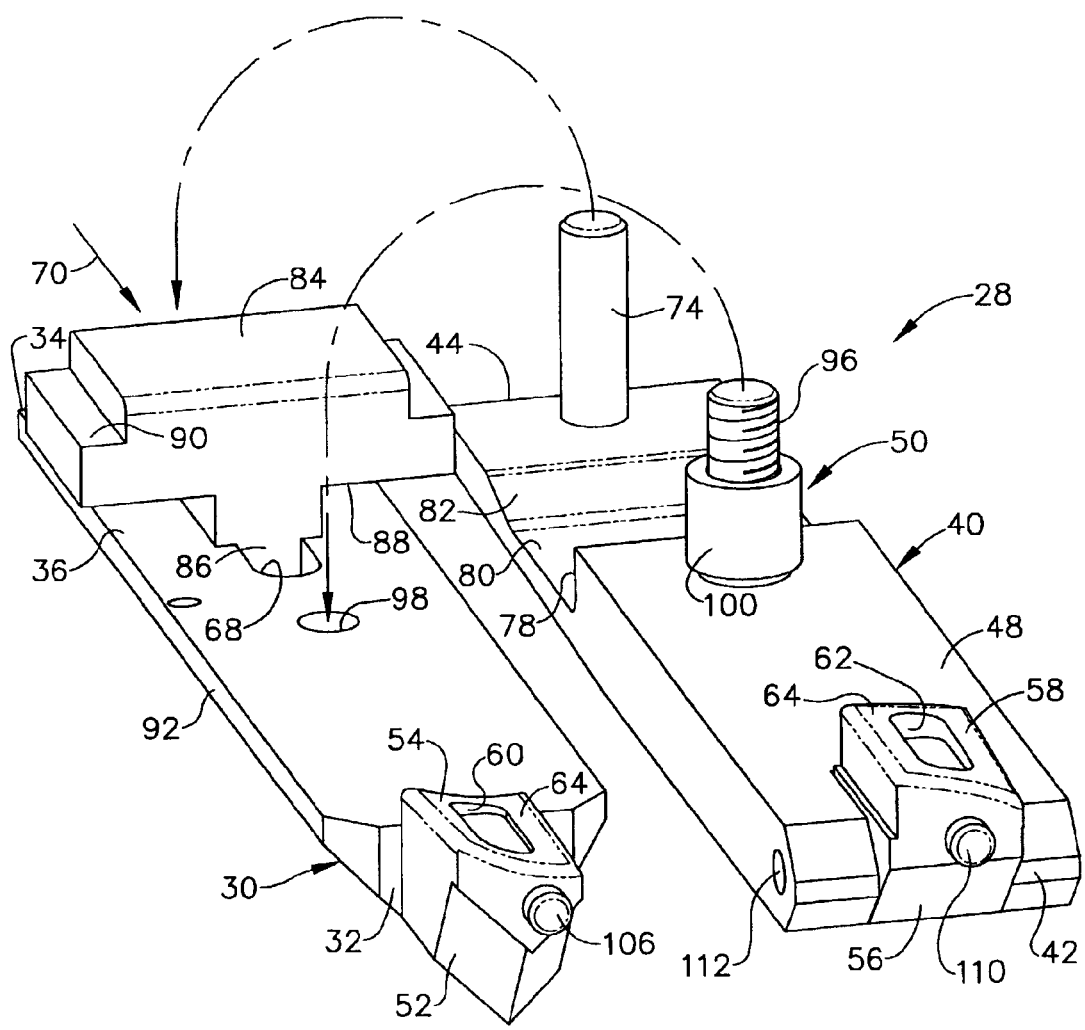
FIG. 2 is a front perspective view of a shuttle device utilized for retaining a gas turbine engine blade in accordance with the present invention, where the top and bottom portions of such device have been disconnected to enable viewing of the interior thereof and the blade and block member have been omitted for clarity.

A device 28, also known herein as a shuttle, is provided so that each blade 10 within a designated size range (i.e., a designated height and chord) is retained therein in a predetermined position and orientation. It will be seen from FIG. 2 that device 28 includes a base portion 30 having a forward end 32, an aft end 34, a top surface 36 and a bottom surface 38. Similarly, a top portion 40 is provided having a forward end 42, an aft end 44, a top surface 46 and a bottom surface 48. It will be understood that a mechanism 50 is preferably provided for connecting base portion 30 and top portion 40 in a desired manner as described in more detail herein.

It will be noted that base portion 30 further includes a forward portion 52 located adjacent forward end 32, where forward portion 52 includes a top surface 54 configured to substantially conform to suction surface 20 of airfoil portion 14 for blade 10. Top portion 40 includes a forward portion 56 located adjacent forward end 42, where forward portion 56 includes a bottom surface 58 configured to substantially conform to pressure surface 18 of airfoil portion 14 for blade 10. In this way airfoil portion 14 is able to be retained between top surface 54 and bottom surface 58 of forward portions 52 and 56, respectively, for base portion 30 and top portion 40. It is preferred, however, that leading edge 19 and trailing edge 21 of airfoil portion 14 extend beyond top surface 54 and bottom surface 58 so that machining operations may be performed thereon while blade 10 is retained by shuttle 28.

Further, it will be seen that top surface 54 preferably includes an open middle section 60 and bottom surface 58 includes a corresponding open middle section 62 so that airfoil portion 14 is contacted about a periphery of suction and pressure surfaces 20 and 18. In this way, a predetermined contact area 64 for suction and pressure surfaces 20 and 18 is provided which sustains proper clamping of airfoil portion 14 without distorting such surfaces 20 and 18. Such predetermined contact area 64 is at least approximately 25% of an area 66 for suction and pressure surfaces 20 and 18. This translates into middle sections 60 and 62 having an area equivalent to approximately 50–75% of area 66.

Base portion 30, which is considered to have a fixed position, preferably further includes an elongated groove portion 68 formed in top surface 36 adjacent aft end 34. Groove portion 68 is substantially aligned with a longitudinal centerline axis 70 extending through device 28 and extends approximately from aft end 34 to a first designated point 72 approximately midway between aft end 34 and forward end 32. A pin member 74 preferably extends from bottom surface 48 of top portion 40 at aft end 44 which is matable with groove portion 68, where pin member 74 is sized to maintain desired spacing (i.e., a minimum gap 75) between base portion 30 and top portion 40 at respective aft ends 34 and 44.

Figure 3:
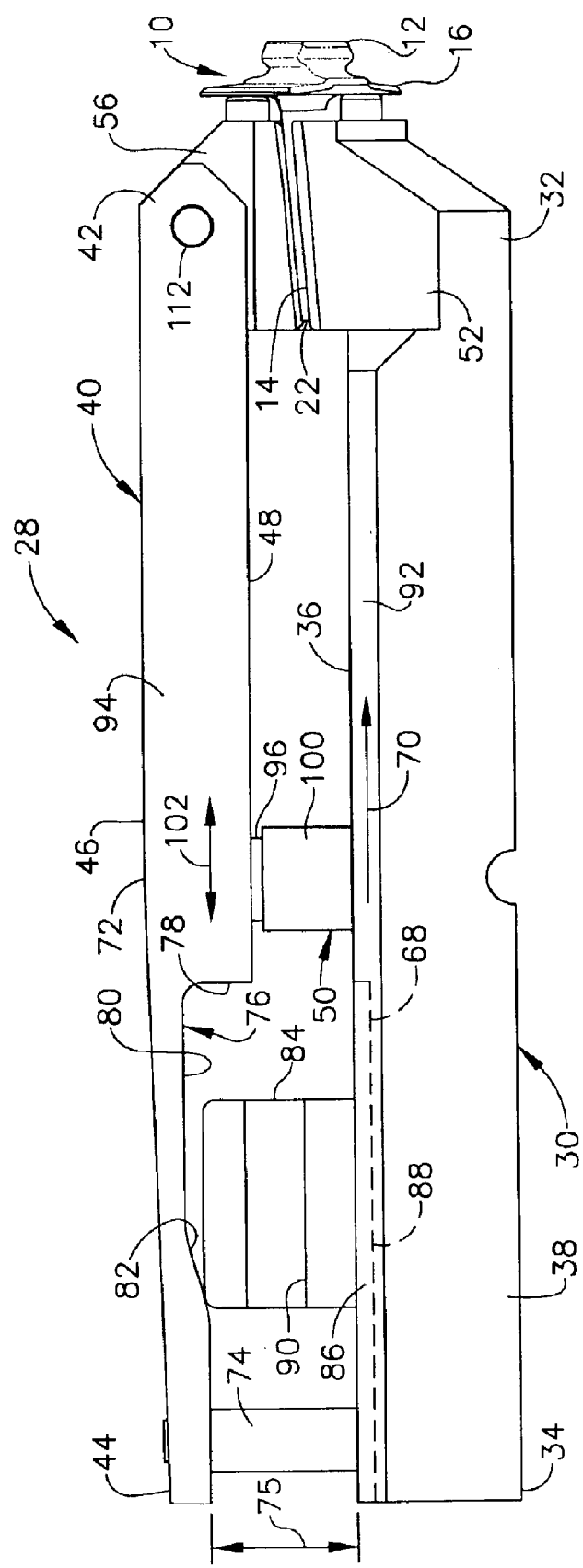
FIG. 3 is a side view of the shuttle device depicted in FIG. 2, where a gas turbine engine blade is shown as being retained therein.
Figure 5:
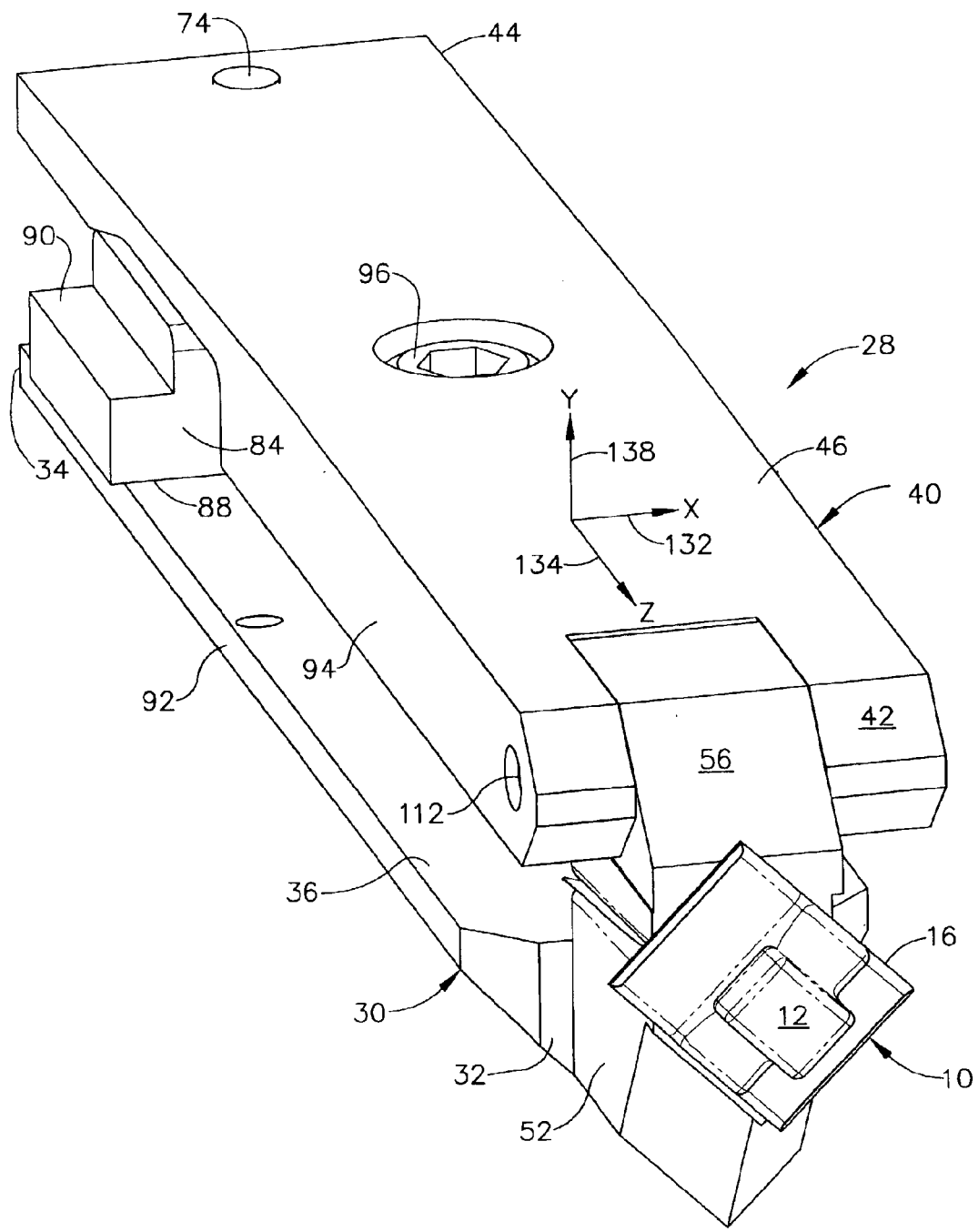
FIG. 5 is a top perspective view of the shuttle device depicted in FIGS. 2–4, where the top and bottom portions thereof are shown as being connected and a gas turbine engine blade is retained therein.

Top portion 40 preferably includes a slot portion 76 formed in bottom surface 48 between midpoint 72 and pin member 74. It will be noted that slot portion 76 includes a forward surface 78 oriented substantially perpendicular to longitudinal centerline axis 70, a middle surface 80 oriented substantially parallel to longitudinal centerline axis 70 and an aft surface 82 oriented at an angle to longitudinal centerline axis 70. A block member 84 (see FIGS. 2, 3 and 5) is preferably positioned within slot portion 76 between base portion 30 and top portion 40, where block member 84 is adapted to slide along groove portion 68 between a first position adjacent midpoint 72 and a second position adjacent pin member 74. Due to the orientation of aft surface 82 for slot portion 76, block member 84 causes top portion 40 to pivot about midpoint 72 like a fulcrum when in the second position. This, in turn, creates a predetermined clamping force between forward portions 52 and 56 of base portion 30 and top portion 40 which retains airfoil portion 14 of blade 10 therebetween.

In order for block member 84 to move substantially along longitudinal centerline axis 70 between the first and second positions, a tab 86 is preferably provided along a bottom surface 88 thereof. It will be appreciated that tab 86 has a width which permits it to be matable with groove portion 68 of base portion 30. For reasons detailed later herein, it will be seen from FIGS. 2 and 5 that block member 84 is preferably configured so as to include a stepped portion 90 which extends beyond adjacent side surfaces 92 and 94 of base and top portions 30 and 40, respectively.

Figure 4:
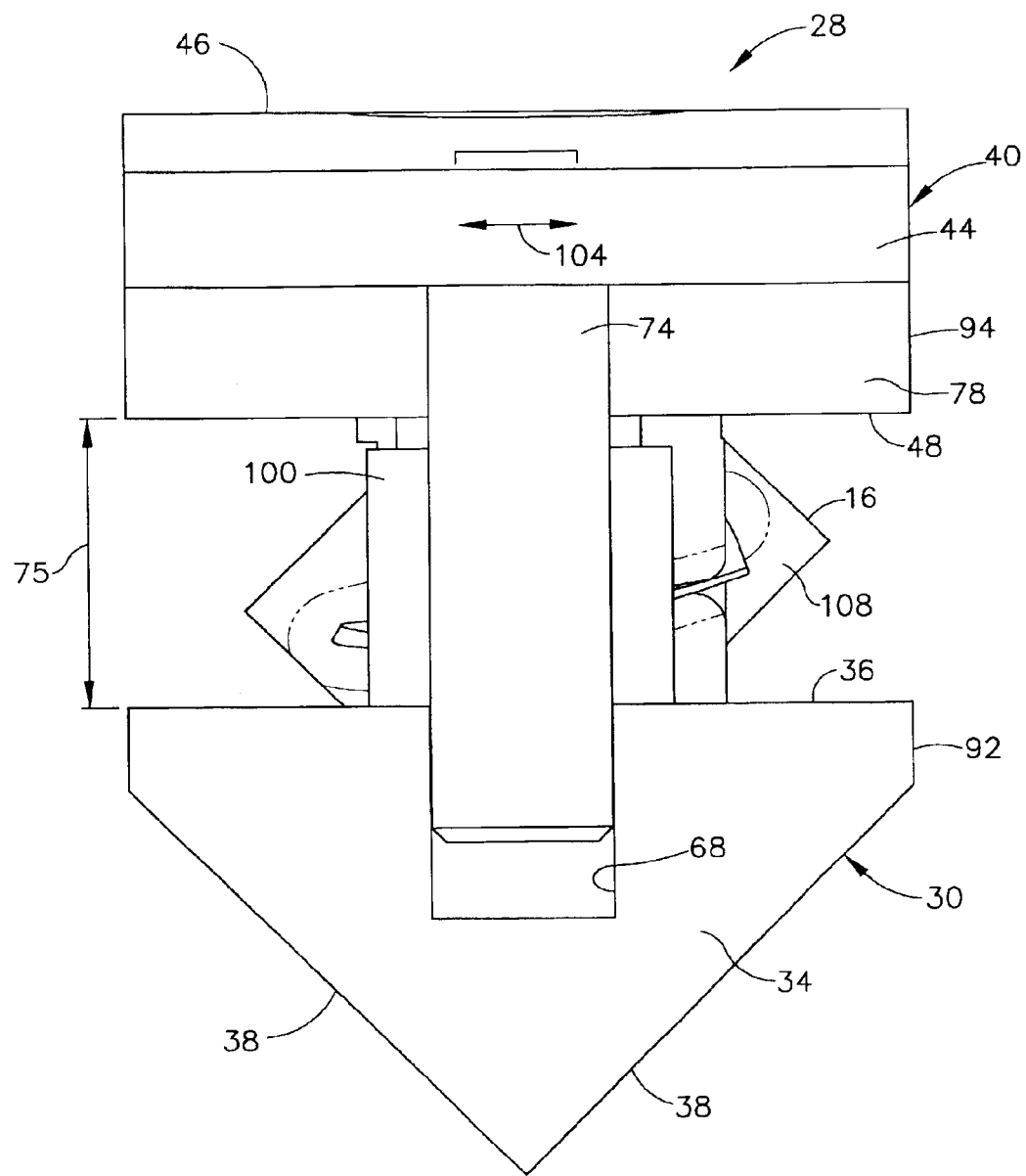
FIG. 4 is an aft view of the shuttle device depicted in FIGS. 2 and 3.

With respect to connecting device 50, it will be seen that a shoulder screw 96 is preferably recessed within top surface 46 of top portion 40 which threadably mates with an opening 98 in base portion 30. While shoulder screw 96 connects top portion 40 to base portion 30, a spacer 100 (e.g., a sleeve or compression spring) is preferably positioned around shoulder screw 96 and between top portion 40 and base portion 30 so that top portion 30 remains pivotable about midpoint 72 in a first direction (i.e., forward and aft represented by arrows 102 in FIG. 3) and in a second direction (i.e., side to side represented by arrows 104 in FIG. 4). Pivoting of top portion 40 in the first direction creates and releases the clamping force on airfoil portion 14, whereas pivoting in the second direction accounts for some misalignment of block member 84 with respect to longitudinal centerline axis 70 as it moves between its first and second position.

In order for blade 10 to be oriented properly within shuttle 28, a locator knob 106 is preferably provided which extends from forward portion 52 of base portion 30. Locator knob 106 is preferably positioned so as to contact a surface 108 of blade platform 16 at a predetermined location. This predetermined location is sometimes referred to in the industry as the z location since it lies along a z axis 134 according to the coordinate system provided in FIGS. 5 and 7. A second knob 110 is preferably provided which extends from forward portion 56 of top portion 40. When platform surface 108 of blade 10 is positioned against locator knob 106, platform surface 108 is spaced a predetermined amount from second knob 110. In this way, second knob 110 functions as a stop against pivoting of top portion 40 in the first direction by more than a designated amount.

It will further be seen that a pin 112 is provided through forward end 42 of top portion 40 transverse to longitudinal centerline axis 70 at a second designated point, where pin 112 is preferably utilized to retain forward portion 56 to top portion 40. Pin 112 also permits forward portion 56 to pivot slightly with respect to top portion 40, thereby enabling easy insertion and removal of blade airfoil portion 14 into and from top surface 54 and bottom surface 58 when block member 84 is in the first position. It will be noted that pin 112 is located between tip 22 and platform 16 of blade 10.

Figure 6:
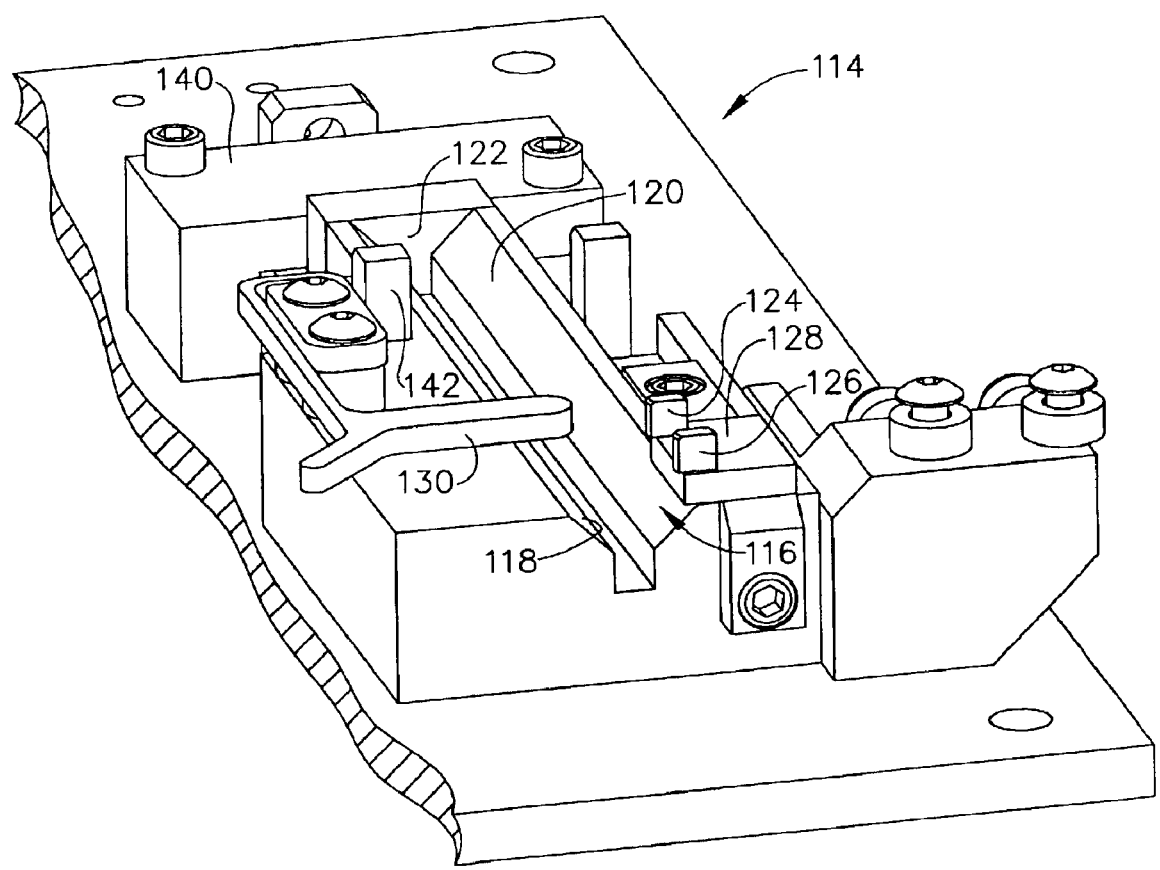
FIG. 6 is a partial top perspective view of a locating fixture utilized to orient a gas turbine engine blade in a predetermined manner within the shuttle device, where the shuttle device has been omitted for clarity.
Figure 7:
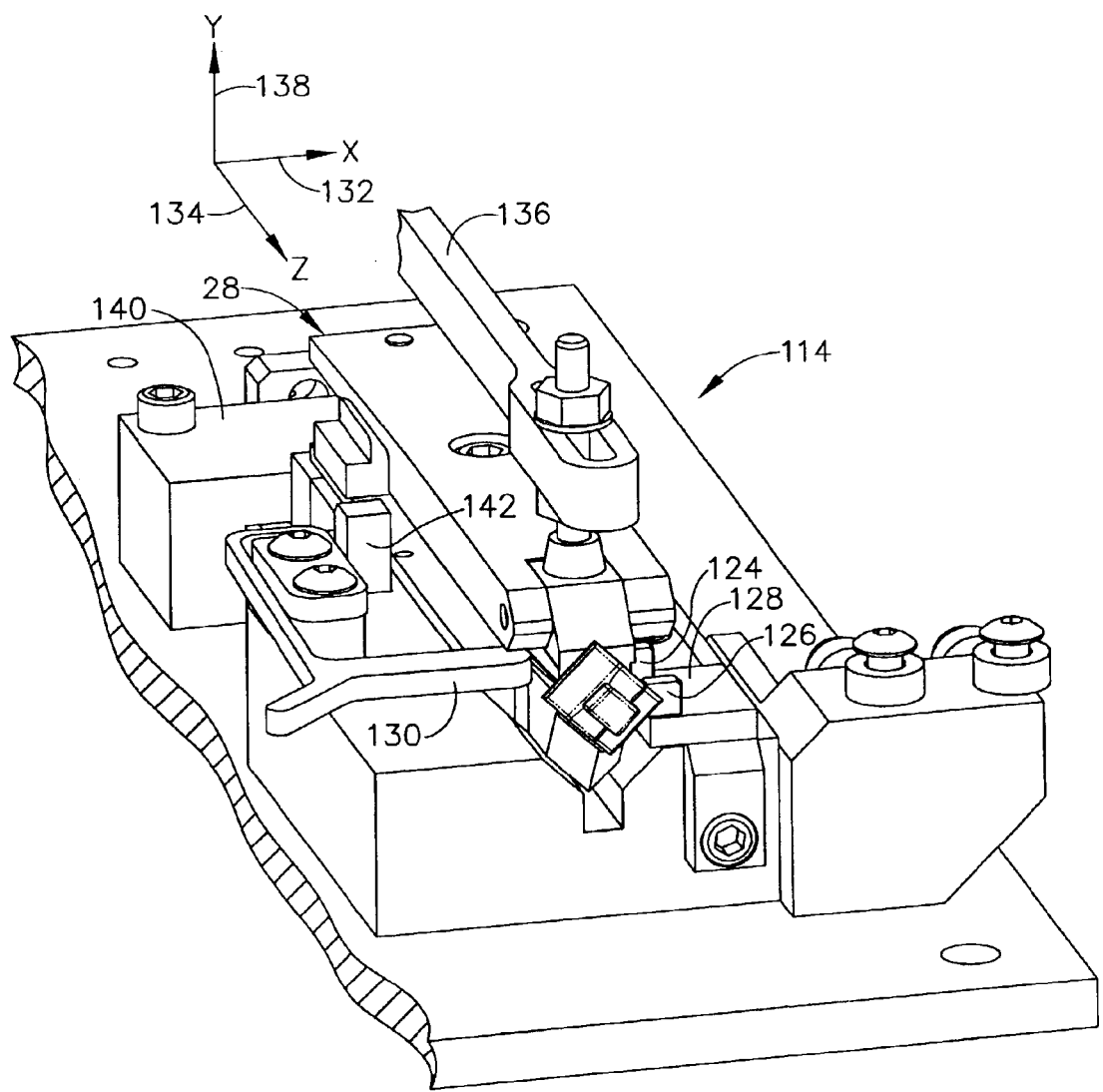
FIG. 7 is a partial top perspective view of the locating fixture depicted in FIG. 6, where the shuttle device is positioned therein.

In order for blade 10 to be positioned in shuttle 28 so as to have the predetermined orientation prior to block member 84 being placed in the second (or clamping) position, it is preferred that shuttle 28 be positioned within a locating fixture 114 as seen in FIG. 7. As seen in FIGS. 6 and 7, locating fixture 114 includes a receptacle portion 116 having substantially v-shaped side walls 118 and 120, as well as an aft wall 122, so that bottom surface 38 and aft end 34 of base portion 30 are able to rest in position thereagainst. A pair of locator members 124 and 126 are provided on a support member 128 so that leading edge 19 of airfoil portion 14 is able to be positioned thereagainst. A spring clamp 130 is retracted in order to place leading edge 19 in position, but is then released to engage trailing edge 21 of airfoil portion 14 and retain blade 10 in the proper orientation along an x axis 132. In particular, a predetermined relationship then exists between longitudinal centerline axis 70 of shuttle 28 and second stacking axis 26 through root portion 12. Of course, if second stacking axis 26 is aligned with first stacking axis 24 through airfoil portion 14, the same predetermined relationship will exist between first stacking axis 24 and longitudinal centerline axis 70.

Typically, a force is provided to root portion 12 of blade 10 along a z axis 134 (such as by a thumb of the operator) in order to maintain shuttle 28 against aft wall 122. While this is performed, an overarm clamp 136 or some similar device is utilized to provide an initial clamping force on top portion 40 of shuttle 28 along a y axis 138. Such clamping force, which preferably is at least approximately 40-200 pounds, holds airfoil portion 14 of blade 10 in position and preferably is applied at about the location of pin 112 so that forward portion 56 of top portion 40 is unable to pivot.

Once shuttle 28 is clamped while blade 10 is retained in the predetermined orientation, a mechanism 140 is activated which causes an actuator 142 (e.g., via hydraulics or the like) to engage stepped portion 90 of block member 84 and move block member 84 from its first position to the second position adjacent pin member 74. This, in turn, causes top portion 40 of shuttle 28 to provide a clamping force along y axis 138 substantially equivalent to that from overarm clamp 136 at forward portions 52 and 56 that retains airfoil portion 14 in the predetermined position and orientation. Block member 84 will be held in its second position by friction against aft surface 82 of slot portion 76.

Figure 8:
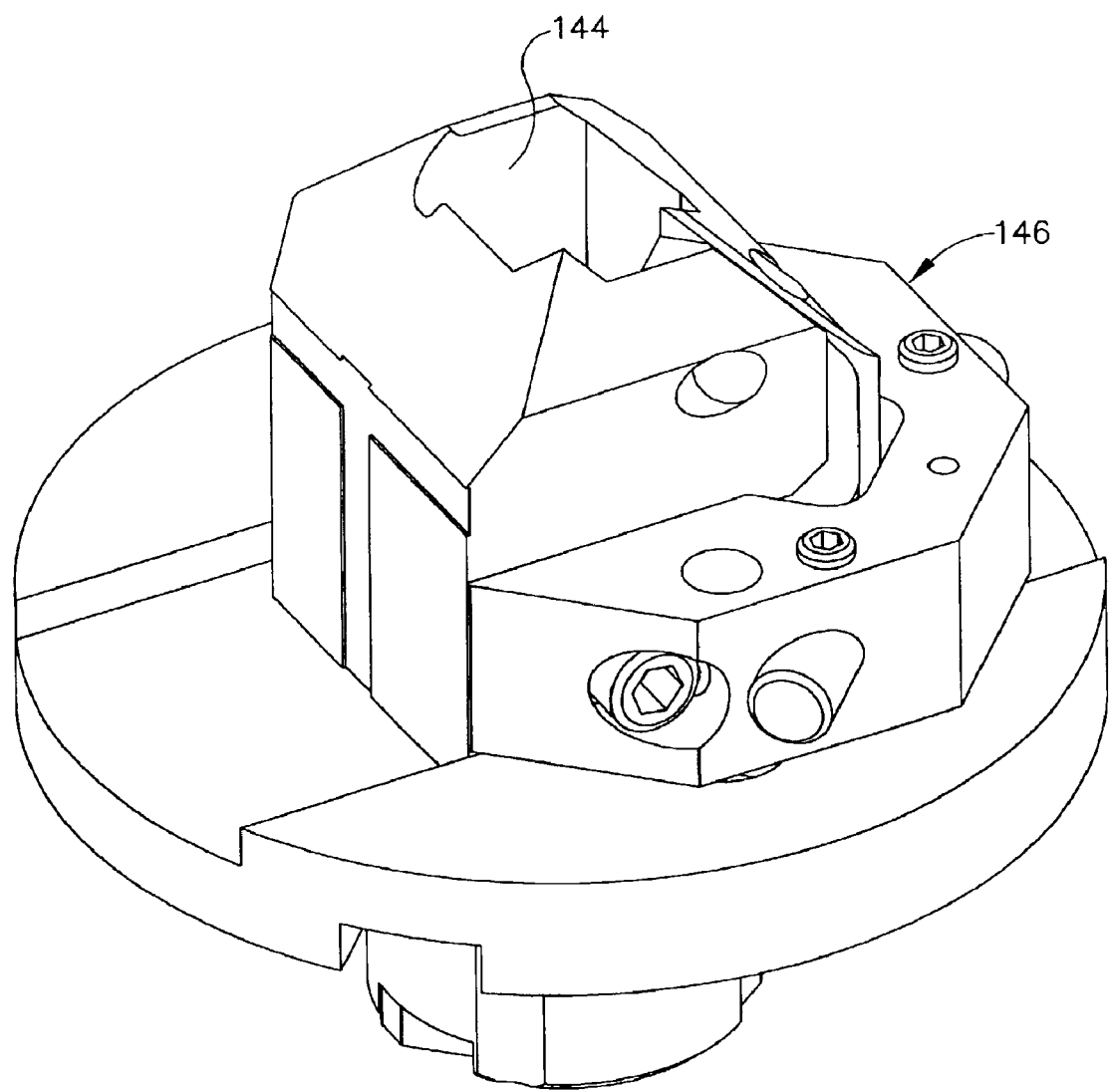
FIG. 8 is a top perspective view of a multi-axis grinding machine including a loading fixture therein for receiving the retention device; and, FIG. 9 is a top perspective view of the multi-axis grinding machine depicted in FIG. 8, where the shuttle device is shown as being positioned within the loading fixture provided therein.
Figure 9:
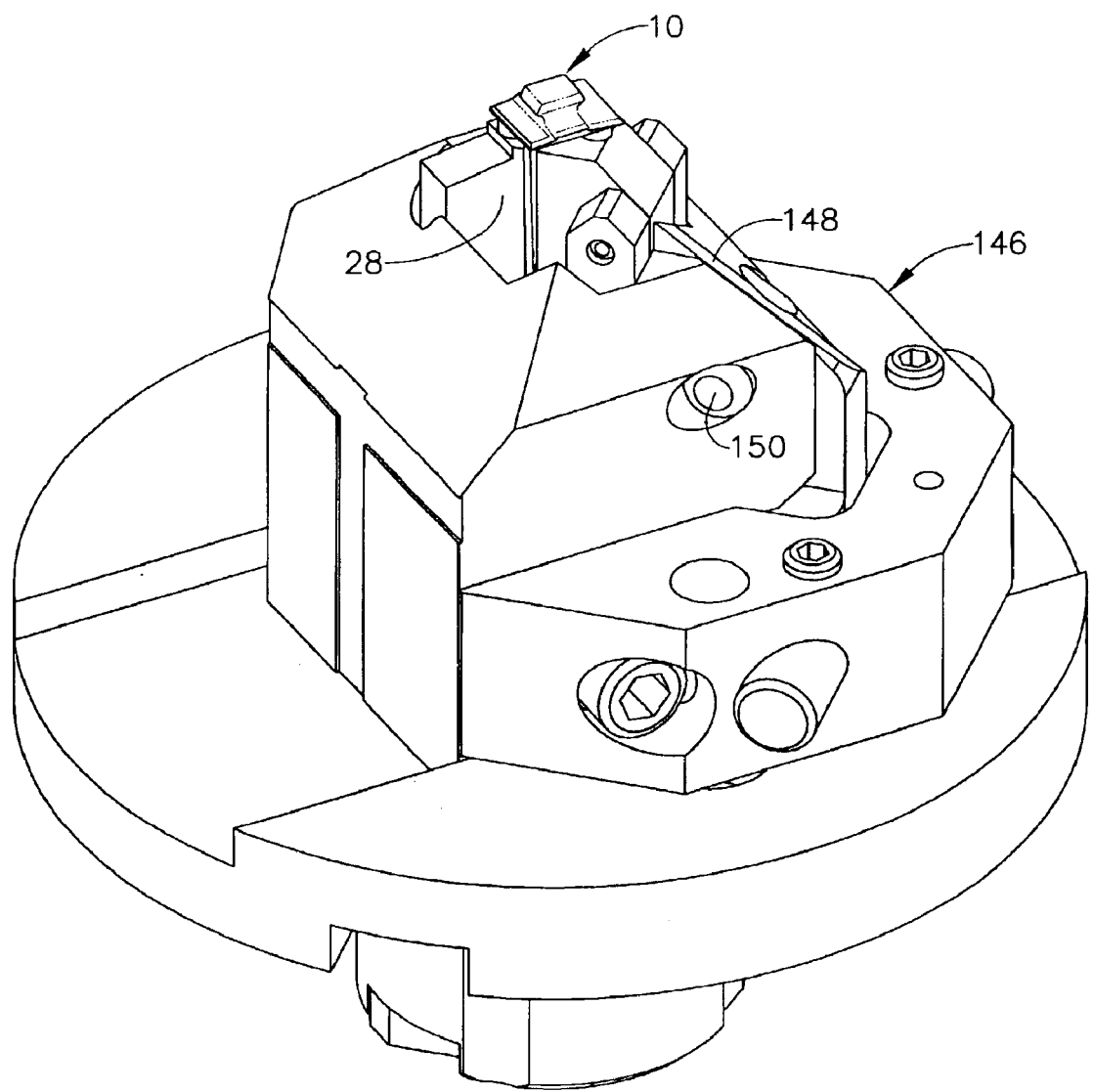

Overarm clamp 136 is then able to be disengaged and shuttle 28 is now ready to be positioned within a loading fixture 144 of a machining device 146 (such as a multi-axis grinder as depicted in FIGS. 8 and 9). It will be appreciated that loading fixture 144 is configured like receptacle portion 116 of locating fixture 114 so that the position and orientation of blade 10 is maintained between movement of shuttle 28 between locating fixture 114 and loading fixture 144. Machining device 146 will preferably include a software driven control system which causes certain grinding operations to be performed on root portion 12 of blade 10 in accordance with the parameters for blade 10. Thus, the particular blade being machined must be identified by machining device 146, such as through a bar code type device, or it must be identified and input into the system by the operator.

As seen in FIG. 9, an additional clamping device 148 may be provided with machining device 146 to hold shuttle 28 in place within loading fixture 144. For example, a lever 150 associated with clamping device 148 is actuated so as to provide a clamping force at approximately the location of pin 112 when shuttle 28 is in loading fixture 144. Since machining device 146 may provide several types of operations (e.g., grinding, milling, turning, etc.), the amount of clamping force applied by clamping device 148 is preferably dependent upon the operation being performed. For example, only about 20–25 pounds of clamping force is normally provided for grinding operations.

In accordance with shuttle 28 and locating fixture 114, a method of retaining a gas turbine engine blade 10 in a fixed predetermined position is evident. Initially, airfoil portion 14 of blade 10 is inserted within shuttle 28 so as to be loosely held therein. This is accomplished via forward portions 52 and 56 of bottom and top portions 30 and 40, especially since forward portion 56 may be pivoted slightly. Thereafter, blade 10 is oriented so as to have a predetermined relationship with shuttle 28 by positioning shuttle 28 within locating fixture 114. In particular, this involves aligning blade 10 along x axis 132 and z axis 134 so that second stacking axis 26 has a predetermined relationship with longitudinal centerline axis 70 of shuttle 28 and locator knob 106 of base forward portion 52 contacts platform surface 108 at a predetermined position. Once blade 10 is properly oriented, an initial temporary clamping force is provided on shuttle 28 along y axis 138 (via overarm clamp 136 of locating fixture 114) which retains blade 10 in the desired predetermined position and orientation. A mechanism (i.e., block member 84, which is configured to extend beyond side surfaces 92 and 94) associated with shuttle 28 is then actuated (moved from a first position to a second position by actuator 142) to provide a fixed clamping force on airfoil portion 14 so that blade 10 is retained in the predetermined position and orientation once the initial temporary clamping force is removed.

The method may also include the step of verifying orientation of blade 10 as being in the predetermined position prior to actuating mechanism 140 for moving block member 84 in locating fixture 114. This may be accomplished manually by attempting to slide a shim, for example, between leading edge 19 of blade 10 and locator members 124 and 126 of locating fixture 114.

It will be appreciated from above that another step of the method includes configuring a portion of shuttle 28 to include a pair of mating surfaces (i.e., top surface 54 of base forward portion 52 and bottom surface 58 of top forward portion 56) which circumscribe a periphery of suction surface 20 and pressure surface 18 of airfoil portion 14. As indicated previously, such mating surfaces will preferably contact a predetermined portion (i.e., contact area 64) of airfoil portion 14 while allowing leading edge 19 and trailing edge 21 to extend beyond top surface 54 and bottom surface 58. In this way, blade 10 is able to be oriented by clamping leading edge 19 and trailing edge 21 of airfoil portion 14. Of course, shuttle 28 is configured so as to retain blade 10 having a predetermined size range (height and chord).

Top portion 40 and base portion 30 of shuttle 28 are preferably connected so as to create a fulcrum about first designated point 72 of shuttle 28. Accordingly, top portion is pivotable about first designated point 72 in a first direction (see arrows 102) and a second direction (see arrows 104). A minimum gap 75 between top portion 40 and base portion 30 is maintained by spacer 100 at midpoint 72, as well as by pin member 74 at aft ends 34 and 44. The method also includes the step of preventing top portion 40 from pivoting about first designated point 72 in the first direction by more than a predetermined amount via second knob 110 on forward portion 56 of top portion 40.

Forward portion 56 of top portion 40 is also permitted to pivot about pin 112 at second designated point located adjacent forward end 42 of top portion 40. Although forward portion 56 is prevented from pivoting more than a predetermined amount, it is at this location that the initial clamping force provided by overarm clamp 136 takes place.

It will be noted that not only is shuttle 28 configured to be received in locating fixture 114 for orientation of blade 10, but also within a corresponding loading fixture 144 of a machining device 146. In this way, consistency of the position and orientation for blade 10 is maintained.

Having shown and described the preferred embodiment of the present invention, further adaptations of shuttle 28, locating fixture 114 and loading fixture 144 of machining device 146 may be made within the scope of the present invention. Moreover, steps in the method of retaining a blade of a gas turbine engine in a predetermined position may be altered and still perform the intended function.

What is claimed is:

1. A method of retaining a gas turbine engine blade in a fixed predetermined position, comprising the following steps:
   (a) inserting an airfoil portion of said gas turbine engine blade within a device so as to be loosely held therein;
   (b) orienting said gas turbine engine blade so as to have a predetermined relationship with said device;
   (c) providing an initial clamping force on said device so as to retain said gas turbine engine blade in said predetermined position; and
   (d) actuating a mechanism associated with said device to provide a fixed clamping force on said airfoil portion so that said gas turbine engine blade is retained in said predetermined position.

2. The method of claim 1, further comprising the step of removing said initial clamping force on said device.

3. The method of claim 1, further comprising the step of verifying orientation of said gas turbine engine blade in said predetermined position prior to actuating said mechanism.

4. The method of claim 1, further comprising the step of configuring a portion of said device to include a pair of mating surfaces which circumscribe a periphery of a pressure surface and a suction surface of said airfoil portion.

5. The method of claim 4, wherein said mating surfaces of said device contact a predetermined portion of said airfoil portion.

6. The method of claim 4, further comprising the step of configuring said device portion to retain a gas turbine engine blade having a predetermined size range.

7. The method of claim 4, further comprising the step of configuring said device portion so that a leading edge and a trailing edge of said airfoil portion extend beyond said mating surfaces.

8. The method of claim 1, wherein said gas turbine engine blade is oriented to have a predetermined relationship with said device along a first axis.

9. The method of claim 8, wherein a stacking axis of said gas turbine engine blade has a predetermined relationship with a centerline axis through said device.

10. The method of claim 1, wherein said gas turbine engine blade is oriented to have a predetermined relationship with said device along a second axis.

11. The method of claim 1, wherein said initial and fixed clamping forces on said gas turbine engine blade are directed along a third axis.

12. The method of claim 1, said orienting step further comprising positioning said device within a locating fixture.

13. The method of claim 1, further comprising the step of positioning a first knob on said device so as to contact a predetermined location of a top platform surface for said gas turbine engine blade.

14. The method of claim 1, said orienting step further comprising clamping a leading edge and a trailing edge of said airfoil portion in a predetermined location.

15. The method of claim 1, further comprising the step of connecting a pivotable top portion and a fixed base portion of said device so as to create a fulcrum about a first designated point.

16. The method of claim 15, wherein said top portion is pivotable about said first designated point in a first direction.

17. The method of claim 15, wherein said top portion is pivotable about said first designated point in a second direction.

18. The method of claim 15, further comprising the step of maintaining a minimum gap between top and base portions of said device.

19. The method of claim 15, said actuating step further comprising moving a block member positioned between said top and base portions of said device between a first position and a second position so that said top portion functions to provide said fixed clamping force on said gas turbine engine blade.

20. The method of claim 19, further comprising the step of configuring said block member so as to extend beyond respective side surfaces of said top and base portions of said device.

21. The method of claim 15, further comprising the step of configuring said top and base portions so as to be received in a machining fixture.

22. The method of claim 15, further comprising the step of permitting said top portion of said device to pivot about a second designated point.

23. The method of claim 22, further comprising the step of preventing said top portion of said device from pivoting about a second designated point more than a predetermined amount.

24. The method of claim 22, wherein said initial clamping force is applied adjacent said second designated point.

25. The method of claim 15, further comprising the step of preventing said top portion of said device from pivoting about said first designated point away from said airfoil portion more than a predetermined amount.

* * * * *